June 29, 1965
L. DOYEN ETAL
3,192,095
MACHINE FOR PRODUCING BAGS OF PLASTIC MATERIAL
Filed Aug. 6, 1962
2 Sheets-Sheet 1
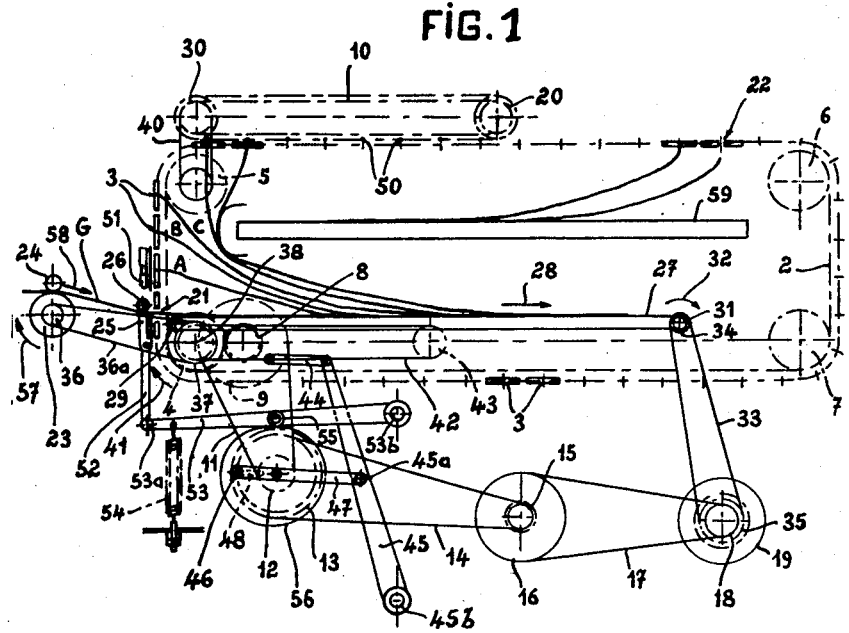
LÉON DOYEN
LOUIS DOYEN
*INVENTORS.*
BY
*Karl G. Ross*
AGENT

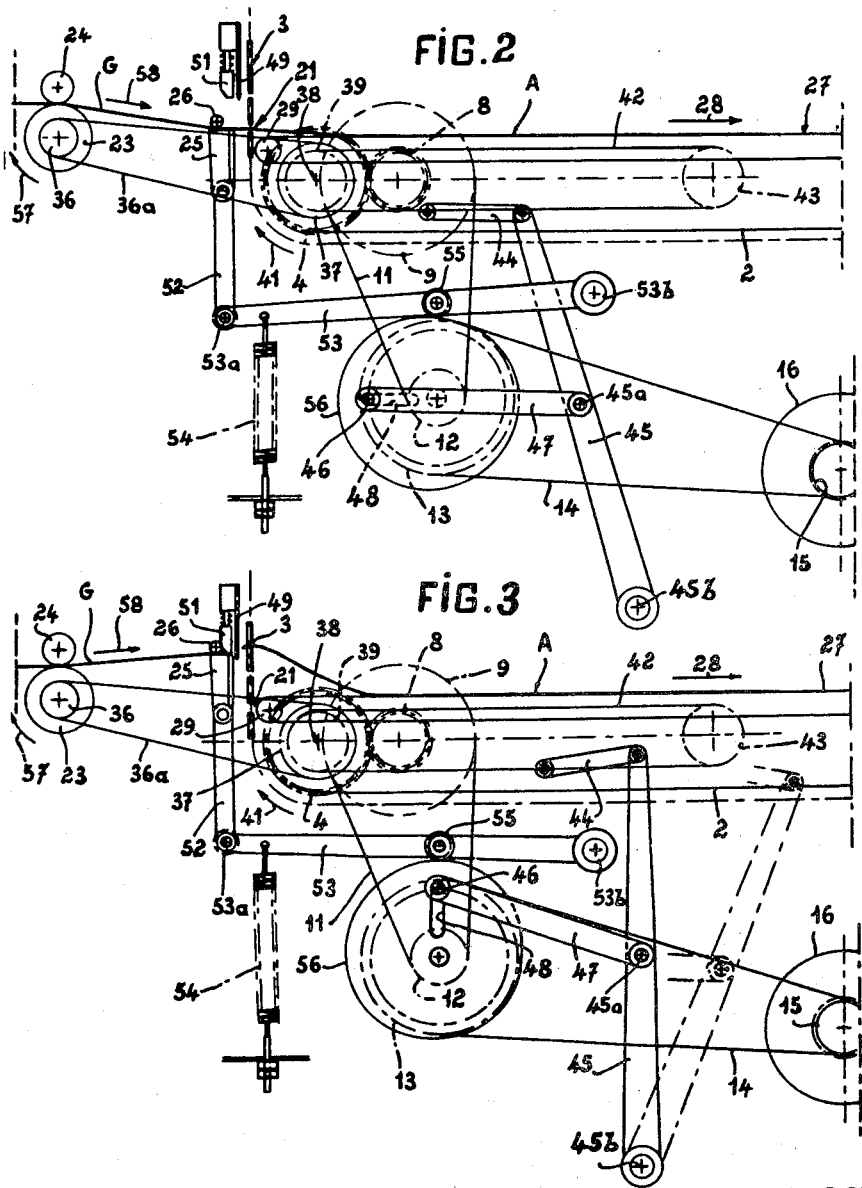

United States Patent Office 3,192,095
Patented June 29, 1965

3,192,095
MACHINE FOR PRODUCING BAGS OF
PLASTIC MATERIAL
Léon Doyen and Louis Doyen, both of
79 Rue de Bourgogne, Lyon, France
Filed Aug. 6, 1962, Ser. No. 214,951
Claims priority, application France, Aug. 9, 1961,
41,798, Patent 1,290,056
5 Claims. (Cl. 156—510)

Our invention has for its object an automatic machine for producing at a high rhythm bags of plastic material which may be given a large size.

In said machine, the plastic material which is supplied intermittently in sheath formation, is introduced into the machine as as to be driven into the center of the latter by two jaws rigid with a first endless chain assuming a continuous movement, following which the sheath is cut transversely across a line registering with cooperating jaws upon engagement over a stationary blade, the cut sheath section being finally conveyed into welding means including a second endless chain progressing at the same speed as the first-mentioned chain and having one of its strands moving in registry with a corresponding strand of the latter; said second chain carries a plurality of heating means of which the spacing corresponds to that of the jaws on the first chain, so that the edges of the cut sheath section projecting beyond said jaws may be welded under the action of the heat radiated by said heating means during the synchronous movement of said chain strands in registry with each other.

Our invention will be properly understood upon reading of the following disclosure, reference being made to the accompanying diagrammatic drawings illustrating by way of example and by no means in a limiting sense, a preferred embodiment of our improved machine. In said drawings:

FIG. 1 is a general view of different driving gears and chains incorporated with the machine.

FIG. 2 is a view on a large scale of the system including means feeding and cutting the sheath in a position corresponding to the end of the feed.

FIG. 3 is a view of the same system as that shown in FIG. 2 but illustrated at the end of the cutting stage.

In the drawings, there is shown an endless conveyor chain 2 carrying a plurality of jaws 3 and driven by a pinion 4 so as to progress over the wheels 5, 6 and 7 at a constant speed. The pinion 4 is driven through the agency of the pinion 8, of the pulley 9, of the belt 11, of the pulleys 12 and 13 coaxially rigid with each other, of the belt 14, of the further pulleys coaxially rigid with each other and illustrated at 15 and 16, of the belt 17 and of the pulley 18 driven by the motor 19.

The jaws are closed throughout their travel, except at two points 21 and 22 forming respectively the point feeding the sheath and the point at which the finished bag is released.

Over a fraction of its path, that is between the pulleys 5 and 6, the first chain 2 moves in the vicinity of and in parallelism with a second chain 10 held tensioned between the pulleys 20 and 30 and assuming, under the action of the pulleys 5 and 30 and of a belt 40 extending between the latter, a continuous movement at the same speed as the chain 2. Said chain carries a number of heating strips 50, the spacing of which is equal to that of the jaws 3; said strips are positioned in a manner such that throughout the line of travel common to the two chains 2 and 10, one jaw may always register with one strip.

The feeding of the plastic material G is provided through the agency of the rollers 23 and 24 between which said plastic sheath is clamped before it slides over the stationary blade 25 over which it is held by the roller 26 revolving at a high and constant speed. The sheath G passes then through the open jaws at 21 before it is drawn out through suction onto the endless belt conveyor 27 moving in a continuous manner in the direction of the arrow 28 over the wheels 29 and 31.

The sheath G is urged against the belt 27 by the successive bags which are being formed out of it at A, B, C and which assume a half raised position. The belt-controlling wheel 31 is driven at a constant speed in the direction of the arrow 32 by the motor 19 through the agency of the belt 33 and of the wheels 34 and 35.

A pulley 36 keyed to the same shaft as the sheath-feeding roller 23 is connected through the belt 36a with the pulley 37. The shaft 38 of the pulley 37 carries under free wheel conditions a toothed wheel 39 which drives the shaft 38 only in the direction of the arrow 41. Said toothed wheel 39 is driven by a chain 42 engaging a toothed wheel 43. Through the link 44, the chain 42 is secured to the end of a lever 45 the opposite end of which is pivotally secured to a stationary stud 45b.

Said lever 45 is connected at 45a through the link 47 with a crank pin 46 fitted on the pulley 13, the eccentricity of said crank pin being adjustable upon shifting thereof within a radial groove 48.

When the motor 19 is operative, the pulley 13 assumes a uniform rotary movement which produces for each of its revolutions an oscillation of the lever 45 round its stationary stud 45b; the amplitude of said oscillation depends on the position of the crank pin 46 in the groove 48. Said lever transmits to the chain 42 a reciprocatory movement. By reason of the free wheel connection leading to the pulley 37, the roller 23 assumes thus an intermittent rotary movement in the direction of the arrow 57.

The stationary blade 49 is carried laterally by damping means 51 and it is associated with the above-mentioned blade 25 which latter is pivotally secured through the link 52 to the end 53a of the lever 53, the other end 53b of which is pivotally secured on a stationary stud.

A spring 54 acts on the lever 53 near its outer end 53a so as to urge it downwardly and to hold the roller 55 on said lever in contact with a cam 56 keyed to the same shaft as the pulleys 12 and 13.

When the motor is operative, said cam 56 executes a rotary movement at a uniform speed which is the same as that executed by the pulley 13 so as to produce, after each revolution, an oscillation of the lever 53 round its stationary pivot at 53a. When the roller 55 enters its uppermost position, the counter-blade 25 engages the damping means 51.

The operation of our improved machine will now be readily understood. Assuming the counter-blade 25 is in its lowermost position, the roller 23 starts rotating and feeds a predetermined length of the plastic sheath G forwardly in the direction of the arrow 58. The introduction of said sheath between the open jaws 21 is made easier by the continuous high-speed rotation of the roller 26. Beyond said jaws 21, the sheath is thus drawn outwardly by the belt 27.

At the end of this sheath-introducing stage, the roller 23 stops, the crank pin 46 having moved past its position illustrated in FIG. 2 and the toothed wheel 39 operating as a free wheel transmits no rotation to the shaft 38, nor, consequently, to the roller 23.

The cam 56 continuing its rotary movement, the roller 55 is raised and the oscillation of the lever 53 urges the counter-blade 25 into its uppermost position for which it engages the damping means 51.

During its upward movement, the counter-blade accompanies the jaws 21 which have been closed at the beginning of the sheath-introducing stage. The sheath is thus held tensioned between the counterblade 25 and said jaws and is cut by the blade 49 against which it then impinges.

By reason of the outline given to the cam 56 and of the presence of the spring 54, the counter-blade thenafter begins moving back downwardly, while the jaws continue moving and bring the edges of the cut section of the sheath into registry with the corresponding heating strip 50. Said edges and said heating strip 50 move then in registry with each other over the path common to the two chains 2 and 10, the welding being thus brought to an end.

After the time required for cooling, the bag which is now finished, is released by the jaws entering the position 22 (FIG. 1). The bag is finally laid on a belt 59 assuming an intermittent movement in a plane perpendicular to the plane of FIG. 1.

The machine disclosed provides the following main advantages:

It allows a very high rhythm of production of say 5,000 bags per hour, as provided in particular by the presence of a plurality of moving welding stations.

The breadth of the bags is limited only by that of the machine.

The length of the bags may be readily adjusted through a mere modification of the amplitude of rocking of the lever 45.

Obviously and as apparent from the preceding disclosure, our invention is by no means limited to the sole embodiment described hereinabove by way of example and it covers, in contradistinction, all the modifications thereof falling within the scope of the accompanying claims and, in particular, the nature of the heating means resorted to may be chosen as desired.

What we claim is:

1. An automatic machine for producing a succession of bags out of a continuous elongated sheath of plastic material, said machine comprising a support, a mechanism driving the sheath intermittently with forward movement by successive lengths equal each to one bag length to lay said successive lengths over a section of said support extending beyond a predetermined stationary location, an endless main chain adapted to move over a path passing through said predetermined location, a succession of jaws carried by said main chain and equally spaced therealong, common means driving the sheath-driving mechanism and the main chain in timed relationship such that the passages of the successive jaws in registry with said predetermined location coincides with the intervals between the intermittent forward movements of said sheath-driving mechanism, means adapted to open transiently the successive jaws as they pass through said predetermined location and through a further point of the path of the chain respectively to ensure a clamping of the rear end of the sheath at said predetermined point and its release at said further location, a stationary cutter facing a point of the sheath lying just ahead of said predetermined location between the sheath-driving mechanism and the last-mentioned point, a reciprocatory counter blade controlled by said common means and urging the sheath during the intervals between its forward movements and after it has been clamped by a jaw on the chain into engagement with the cutter to cut off the forward section of the sheath clamped by said jaw and lying beyond the predetermined location, an auxiliary endless moving chain extending along a path part of which registers with a part of the path of the main chain extending between the predetermined location and said further point, means constraining the two chains to progress at the same speed along the registering parts of their paths, a plurality of heating means carried by the second chain with a spacing equal to that of the jaws on the main chain and adapted to register with corresponding jaws during their travel over said part of the path of the auxiliary chain to close through welding the rear ends of the cut sheath sections projecting beyond said corresponding jaws, and means collecting the bags formed by said closing of the cut sheath sections.

2. An automatic machine for producing a succession of bags out of a continuous elongated sheath of plastic material comprising a support, a mechanism driving the sheath intermittently into forward movement by successive lengths equal each to one bag length to lay said successive lengths over a section of said support extending beyond a predetermined stationary point, means for adjusting the length of sheath fed by said sheath-driving mechanism, an endless main chain adapted to move over a path passing through said predetermined point, a succession of jaws carried by said main chain at equally spaced points on the latter, common means driving the sheath-driving mechanism and the main chain in timed relationship such that the passages of the successive jaws in registry with said predetermined point coincide with the intervals between the intermittent forward movements of said sheath-driving mechanism, means adapted to open transiently the successive jaws as they pass through said predetermined point and through a further point of the path of the chain respectively to ensure a clamping of the rear end of the sheath at said predetermined point and its release at said further point, a stationary cutter facing a point of the sheath lying just ahead of said predetermined point between the sheath-driving mechanism and last-mentioned point, a reciprocatory counter blade controlled by said common means and urging the sheath during the intervals between its forward movements and after it has been clamped by a jaw on the chain into engagement with the cutter to cut off the forward section of the sheath clamped by said jaw and lying beyond the predetermined point, an auxiliary endless moving chain extending along a path part of which registers with a part of the path of the main chain extending between the predetermined point and said further point, means constraining the two chains to progress at the same speed along the registering parts of their paths, a plurality of heating means carried by the auxiliary chain with a spacing equal to that of the jaws on the main chain and adapted to register with corresponding jaws during their travel over said part of the path of the auxiliary chain to close through welding the rear ends of the cut sheath sections projecting beyond said corresponding jaws, and means collecting the bags formed by said closing of the cut sheath sections.

3. An automatic machine for producing a succession of bags out of a continuous elongated sheath of plastic material comprising a support, a mechanism driving the sheath intermittently into forward movement by successive lengths equal each to one bag length to lay said successive lengths over a section of said support extending beyond a predetermined stationary point, an endless main chain adapted to move over a path passing through said predetermined point, a succession of jaws carried by said main chain at equally spaced points of the latter, a motor, means operatively connecting the motor with the main chain to make the latter assume a continuous movement, means adapted to assume a reciprocatory movement of an adjustable amplitude under the control of the motor, unidirectional means operatively connecting last-mentioned means with the sheath-driving mechanism to ensure the intermittent forward movement of the sheath at times such that the passages of the successive jaws in registry with said predetermined point coincide with the intervals between the intermittent forward movement of said sheath-driving mechanism, means adapted to open transiently the successive jaws as they pass through said predetermined point and through a further point of the path of the chain respectively to ensure a clamping of the rear end of the sheath at said predetermined point and its release at said further point, a stationary cutter facing a point of the sheath lying just ahead of said predetermined point between the sheath-driving mechanism and last-mentioned point, a reciprocatory counter blade controlled by said motor and urging the sheath during each interval between its forward movements and after it has been clamped by a jaw on the chain into engagement with the cutter to cut off the forward section of the sheath clamped by said jaw and lying beyond at the predetermined point, an auxiliary endless moving chain extending along a path a part of which registers with a part of the path of the main chain extending between the predetermined point and said further point, means constraining the two chains to progress at the same speed along the registering parts of their paths, a plurality of heating means carried by the second chain with a spacing equal to that of the jaws on the main chain and adapted to register with corresponding jaws during their travel over said part of the path of the auxiliary chain to close through welding the rear ends of the cut sheath sections projecting beyond said corresponding jaws, and means collecting the bags formed by said closing of the cut sheath sections.

4. An automatic machine for producing a succession of bags out of a continuous elongated sheath of plastic material comprising a support, a mechanism driving the sheath intermittently into forward movement by successive lengths equal each to one bag length to lay said successive lengths over a section of said support extending beyond a predetermined stationary point, an endless main chain adapted to move over a path passing through said predetermined stationary point, a succession of jaws carried by said main chain at equally spaced points of the latter, common driving means driving the sheath-driving mechanism and the main chain in timed relationship such that the passages of the successive jaws in registry with said predetermined point coincides with the intervals between the intermittent forward movements of said sheath-driving mechanism, means adapted to open transiently the successive jaws as they pass through said predetermined point and through a further point of the path of the chain respectively to ensure a clamping of the rear end of the sheath at said predetermined point and its release at said further point, a stationary cutter facing a point of the sheath lying just ahead of said predetermined point between the sheath-driving mechanism and last-mentioned point, and lying in the path of the sheath drawn along by the jaw clamping it said cutters severing the sheath as the jaw progresses with the main chain, to cut off the forward section of the sheath clamped by said jaw and lying beyond the predetermined point, an auxiliary endless moving chain extending along a path a part of which registers with a part of the path of the main chain extending between the predetermined point and said further point, means constraining the two chains to progress at the same speed along the registering parts of their paths, a plurality of heating means carried by the second chain with a spacing equal to that of the jaws on the main chain and adapted to register with corresponding jaws during their travel over said part of the path of the auxiliary chain to close through welding the rear ends of the cut sheath sections projecting beyond said corresponding jaws, and means collecting the bags formed by said closing of the cut sheath sections.

5. An automatic machine for producing a succession of bags out of a continuous elongated sheath of plastic material comprising a belt conveyor adapted to move along an endless path, a mechanism driving the sheath intermittently into forward movement by successive lengths equal each to one bag length to lay said successive lengths over a section of said belt conveyor extending beyond a predetermined stationary point of its path, an endless main chain adapted to move over a path passing through said predetermined point, a succession of jaws carried by said main chain at equally spaced points of the latter, common means driving the sheath-driving mechanism, the conveyor belt and the main chain in time relationship such that the passages of the successive jaws in registry with said predetermined point coincide with the intervals between the intermittent forward movements of said sheath-driving mechanism, the free end of the sheath being permanently urged along said section of the belt conveyor, means adapted to open transiently the successive jaws as they pass through said predetermined point and through a further point of the path of the chain respectively to ensure a clamping of the rear end of the sheath at said predetermined point and its release at said further point, a stationary cutter facing a point of the sheath lying just ahead of said predetermined point between the sheath-driving mechanism and last-mentioned point, a reciprocatory counter blade controlled by said common means and urging the sheath during each interval between its forward movements and after it has been clamped by a jaw on the chain into engagement with the cutter to cut off the forward section of the sheath clamped by said jaw and lying beyond the predetermined point, an auxiliary endless moving chain extending along a path part of which registers with a part of the path of the main chain extending between the predetermined point and said further point, means constraining the two chains to progress at the same speed along the registering parts of their paths, a plurality of heating means carried by the second chain with a spacing equal to that of the jaws on the main chain and adapted to register with corresponding jaws during their travel over said part of the path of the auxiliary chain to close through welding the rear ends of the cut sheath sections projecting beyond said corresponding jaws, and means collecting the bags formed by said closing of the cut sheath sections.

References Cited by the Examiner
UNITED STATES PATENTS

| | | | |
|---|---|---|---|
| 2,720,246 | 10/55 | Piazze | 156—583 |
| 2,925,119 | 2/60 | Jaquiery | 156—510 |
| 2,952,299 | 9/60 | Finke | 156—510 |
| 2,984,288 | 5/61 | Gaubert | 156—583 |

EARL M. BERGERT, *Primary Examiner.*